United States Patent
Koyanagi

(10) Patent No.: US 8,334,627 B2
(45) Date of Patent: Dec. 18, 2012

(54) COMPACT MOTOR

(75) Inventor: Naohisa Koyanagi, Isesaki (JP)

(73) Assignee: Tokyo Parts Industrial Co., Ltd., Gunma-Ken (JP)

( * ) Notice: Subject to any disclaimer, the term of this patent is extended or adjusted under 35 U.S.C. 154(b) by 347 days.

(21) Appl. No.: 12/660,611

(22) Filed: Mar. 2, 2010

(65) Prior Publication Data

US 2010/0289364 A1    Nov. 18, 2010

(30) Foreign Application Priority Data

May 14, 2009   (JP) .................................. 2009-117337

(51) Int. Cl.
*H02K 1/22* (2006.01)
*H02K 1/24* (2006.01)
*H02K 23/04* (2006.01)

(52) U.S. Cl. ............. 310/154.31; 310/154.32; 310/269; 310/40 MM

(58) Field of Classification Search ............ 310/40 MM, 310/154.21, 154.22, 154.25, 154.28, 154.29, 310/264, 269, 154.31–154.3

See application file for complete search history.

(56) References Cited

U.S. PATENT DOCUMENTS

| | | | | | |
|---|---|---|---|---|---|
| 3,064,150 | A | * | 11/1962 | Barnes | 310/154.25 |
| 4,280,072 | A | * | 7/1981 | Gotou et al. | 310/67 R |
| 4,881,002 | A | * | 11/1989 | Yamaguchi | 310/216.092 |
| 7,579,745 | B2 | * | 8/2009 | Yamada et al. | 310/269 |

FOREIGN PATENT DOCUMENTS

JP           61-030945         2/1986

* cited by examiner

*Primary Examiner* — Tran Nguyen
(74) *Attorney, Agent, or Firm* — Jordan and Hamburg LLP

(57) ABSTRACT

In a compact motor 1 comprising a cylindrical permanent magnet 13, which is affixed to the inner surface of a hollow cylindrical yoke 12, and an armature core 22, which is provided at the interior of the permanent magnet 13, the armature core 22 comprises three slots 29 disposed at a uniform pitch, the permanent magnet 13 is bipolar-magnetized, and each magnetic pole has a maximum magnetic flux density value P in a range of 40° to 50° from the center at both sides of the magnetic pole, the maximum value P being within the range of 1.3 times to 1.8 times the magnetic flux density at the center of the magnetic pole.

4 Claims, 9 Drawing Sheets

COMPACT MOTOR

BACKGROUND OF THE INVENTION

The present invention relates to compact motors used in vehicles, audio equipment, video equipment, precision equipment and the like. More specifically, it relates to a compact motor with which cogging torque can be reduced without lowering output torque.

In recent years, with the development of vehicles and various types of precision equipment, the demand for compact motors having low cogging while maintaining high torque is increasing.

Initially, coreless motors, which to not have an armature core, were used as a countermeasure against cogging but, as coreless motors produce relatively low torques, there was a problem in that, in order to produce a large torque, it was necessary to increase the overall size of the motor.

Meanwhile, when large torque is required of compact motors, motors are used in which, as shown in FIG. 8, permanent magnets 103, which have been given alternating north-pole and south-pole magnetizations, are arranged within a case (magnetic yoke) 104, and an armature core 101 having salient poles 102 is disposed facing the inner sides of these permanent magnets 103.

While motors having an armature core of this sort can produce a large torque, there was a problem in that, because magnetic permeability intermittently changes when the boundaries of the magnetic poles of the permanent magnets 103 cross the slots between the salient poles 102, a torque variation is generated, having a frequency that is synchronized with the rotation speed, which is known as cogging.

For this reason, methods for reducing cogging by providing grooves in the salient poles of an armature core have been proposed, for example in JP-61-030945-A. Furthermore, in recent years, when large torques are required of high-quality compact motors, rare earth magnets having strong magnetic force have come to be used for the permanent magnets 103. Examples of methods for magnetizing the permanent magnets include the method wherein, as shown in FIG. 9, magnetization is performed from the exterior of the case 104.

In FIG. 9, 111 indicates magnetizing yokes, on which a magnetizing coil 112 is wound; a solid cylindrical internal yoke 114 is interposed within a sheet member 113 principally comprising a powdered rare earth magnet material and rubber, the sheet member 113 having been affixed to the inner circumferential face of a case 104, which is positioned between a pair of the magnetizing yokes 111. The sheet member 113 is magnetized to a substantially sinusoidal magnetization waveform, for example, by way of applying a DC pulsed voltage to the magnetizing coil 112.

SUMMARY OF THE INVENTION

However, with the device described in JP-61-030945-A, while it was possible to reduce cogging to a certain extent by way of modifying the armature core, the modification of the core was extremely complex, and the reduction in cogging was not sufficient with respect to the ever increasing demand for improved quality.

Furthermore, when rare earth magnets having strong magnetic force were used for the permanent magnet, there was a problem in that, while a size reduction was achieved, the cogging become more pronounced.

Here, an object of the present invention is to provide an improved compact motor that can overcome the problems posed by the prior art described above, which is easy to manufacture, and with which cogging can be reduced without lowering output torque.

The compact motor of the present invention which was made with a view to achieving the object described above comprises:

a hollow cylindrical yoke;

a cylindrical permanent magnet affixed to the inner surface of the hollow cylindrical yoke;

an armature core disposed at the interior of the permanent magnet; and three slots disposed at a uniform pitch in the armature core, the permanent magnet being bipolar-magnetized, with each magnetic pole having a maximum magnetic flux density value located at a position in a range of 40° to 50° from the center on the two sides of the magnetic pole, the maximum magnetic flux density value being within a range of 1.3 times to 1.8 times the magnetic flux density at the center of the magnetic pole.

In the compact motor of the present invention, within a region that includes the maximum magnetic flux density value, the opening angle of a region having a magnetic flux density that is greater than or equal to the average of the maximum magnetic flux density value and the magnetic flux density at the center of the pole is preferably within a range of 1.8 times to 2.2 times the opening angle for the slots.

Furthermore, in the compact motor of the present invention, the opening angle for the slots is preferably within the range of 8° to 25°.

Furthermore, the present invention provides a method of manufacturing a compact motor comprising: a hollow cylindrical yoke; a cylindrical permanent magnet affixed to the inner surface of the hollow cylindrical yoke; an armature core provided at the interior of the permanent magnet; and three slots disposed at a uniform pitch in the armature core, comprising the steps of:

affixing an unmagnetized cylinder of magnetic material to the inner surface of the yoke;

preparing a rectangular core having a substantially rectangular cross-section, so that the opening angle for one side thereof is within the range of 80° to 100°;

disposing the rectangular core at the interior of the cylinder of magnetic material, so as to contact the inner surface of the cylinder of magnetic material; and producing bipolar magnetization in the cylinder of magnetic material by way of a parallel magnetic field external to the yoke, which is substantially orthogonal to one side of the rectangular core.

By virtue of the compact motor of the present invention, in a motor employing a bipolar permanent magnet and a three-pole armature core, as a result of providing two magnetization waveform maxima at predetermined positions within each magnetic pole of the permanent magnet, a high-quality compact motor can easily be realized without changing the shape of the armature core, and cogging torque can be reduced without lowering output torque.

Furthermore, by virtue of the method of manufacturing a compact motor of the present invention, in a motor employing a bipolar permanent magnet and a three-pole armature core, two magnetization waveform maxima can be provided at predetermined positions within each of the poles of the permanent magnet by way of an extremely simple magnetizing device and, as a result, a high quality compact motor capable of reducing cogging torque without lowering output torque can easily be realized, without complex modification of the armature core.

DETAILED DESCRIPTION OF THE PREFERRED EMBODIMENTS

Figure 1:
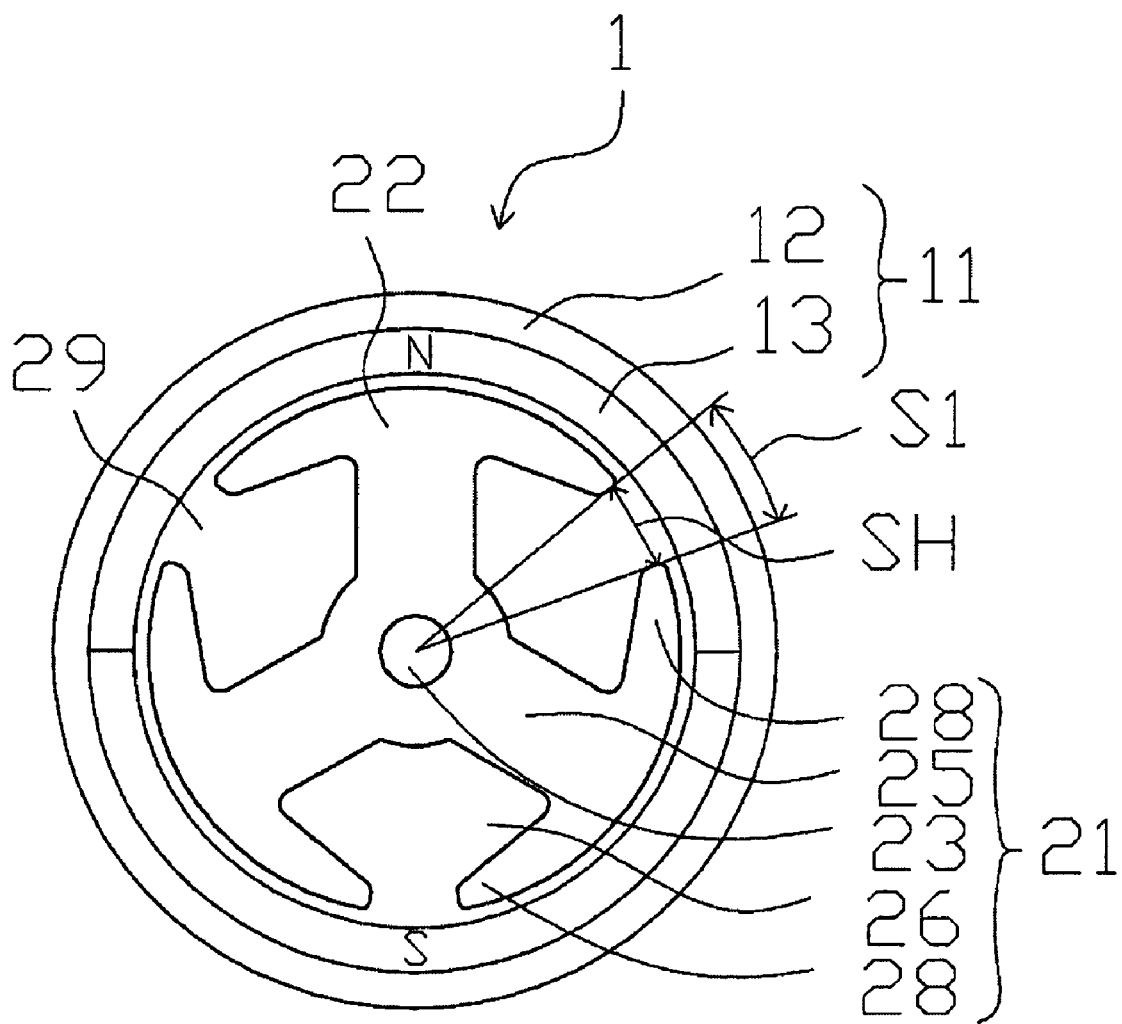
FIG. 1 is a sectional view illustrating one example of a compact motor using a bipolar permanent magnet and a three-pole armature core according to the present invention.

The present invention was achieved as a result of the earnest study undertaken by the present inventors into a configuration for a compact motor 1 having an external diameter of approximately $\phi$ 20 mm, employing a bipolar permanent magnet 13 and a three-pole armature core 22, as shown in FIG. 1, whereby cogging torque can be effectively reduced while limiting loss in output torque.

First, the structure of the compact motor 1, which is shown in FIG. 1, will be described. Reference numeral 11 indicates a stator. This stator 11 comprises: a hollow cylindrical yoke 12, which has a bottom and is made from a metallic material; an isotropic rare earth permanent magnet 13, which is affixed to the inner surface of this yoke 12; and a brush, which is not shown in the drawing. The permanent magnet 13 is bipolar magnetized with a north pole and a south pole in the circumferential direction of the cylinder, and a rotatable rotor 21 is provided at the interior of the permanent magnet 13.

The rotor 21 comprises an armature core 22 consisting of a plurality of laminated thin steel plates, a shaft 23 and a commutator, which is not shown in the drawing. The armature core 22 comprises three teeth 25, which are radially disposed at a pitch of 120°, and coils (not illustrated) are wound on each of the teeth 25, with the ends of the coils (not illustrated) being connected to the commutator. Brushes make sliding contact on this commutator, and when a current is flowing through the brushes, the rotor 21 rotates.

The salient poles 28, which extend in the direction of rotation of the rotor 21, are provided on both sides of the ends of the teeth 25. These salient poles 28 are disposed so that a gap is formed between these and the interior of the permanent magnet 13.

Figure 2:
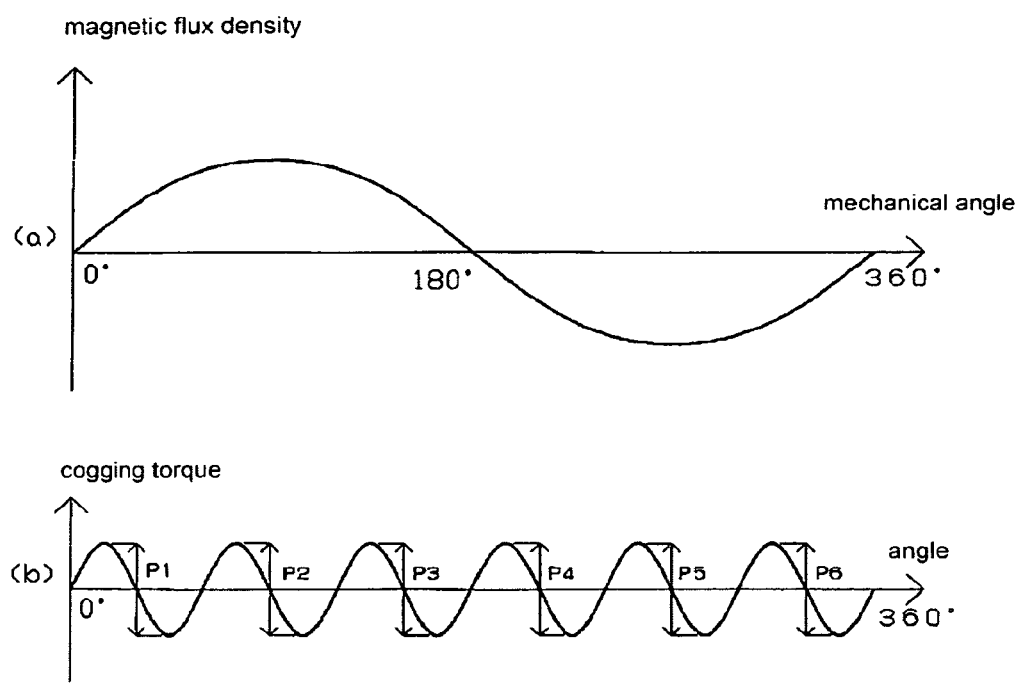
FIG. 2 shows: (a) a magnetization waveform of a permanent magnet in a conventional compact motor; and (b) the cogging torque of that compact motor.
Figure 9:
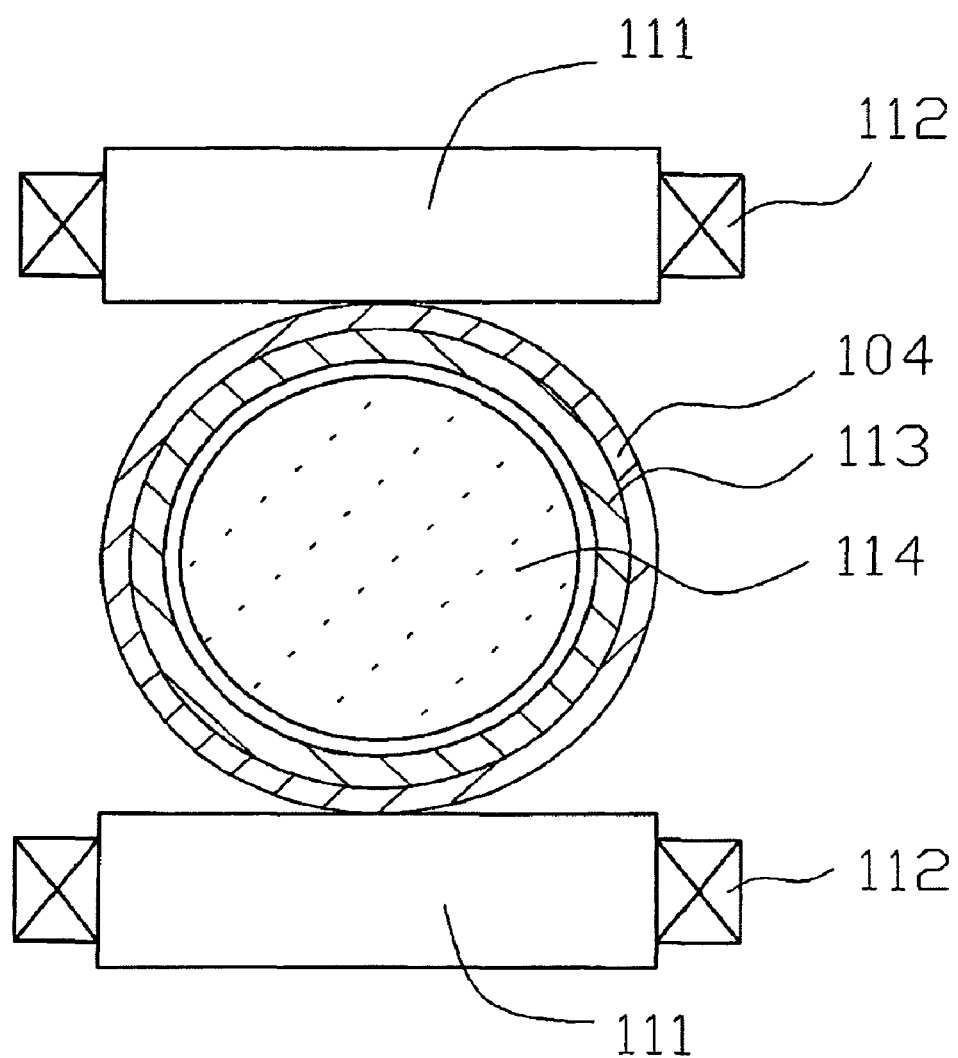
FIG. 9 shows a device for magnetizing a permanent magnet for a conventional compact motor.

The armature core 22 comprises three slots 29, disposed at a uniform pitch between the salient poles 28 of the adjacent teeth 25. Because these slots 29 are present, if the rotor is rotated in the unexcited state, cogging torque is produced. If a permanent magnet that has been magnetized by way of a device such as shown in FIG. 9, for example, is used as the permanent magnet 13, it will have a substantially sinusoidal magnetization waveform such as shown in FIG. 2(a), and the cogging torque will be as shown in FIG. 2(b). Notably, if a rare earth magnet having strong magnetic force is used as the permanent magnet, while the motor size can be reduced, the cogging becomes more pronounced.

Conventionally, as a countermeasure for cogging torque, the armature core was modified, but such modifications required complex processes, and therefore the present inventors focused on the magnetization waveform of the permanent magnet, and experimentally verified the relationship between magnetization waveforms and cogging torques. As a result, it was discovered that it was effective to provide two areas where the magnetic flux density had maximum values of predetermined magnitudes at predetermined positions within the magnetic poles of the permanent magnet.

Hereafter, the present invention is described by way of setting forth the experimental examples performed by the present inventors.

Experimental Example 1

In this experimental example, a compact motor 1 was constructed using a permanent magnet 13 having an external diameter of $\phi$ 18 mm, an internal diameter of $\phi$ 15.5 mm and a height of 13 mm, and an armature core 22 having an external diameter of $\phi$ 15 mm and a slot width SH of 2.11 mm. The cogging torque and output torque of this motor were then measured.

Figure 3:
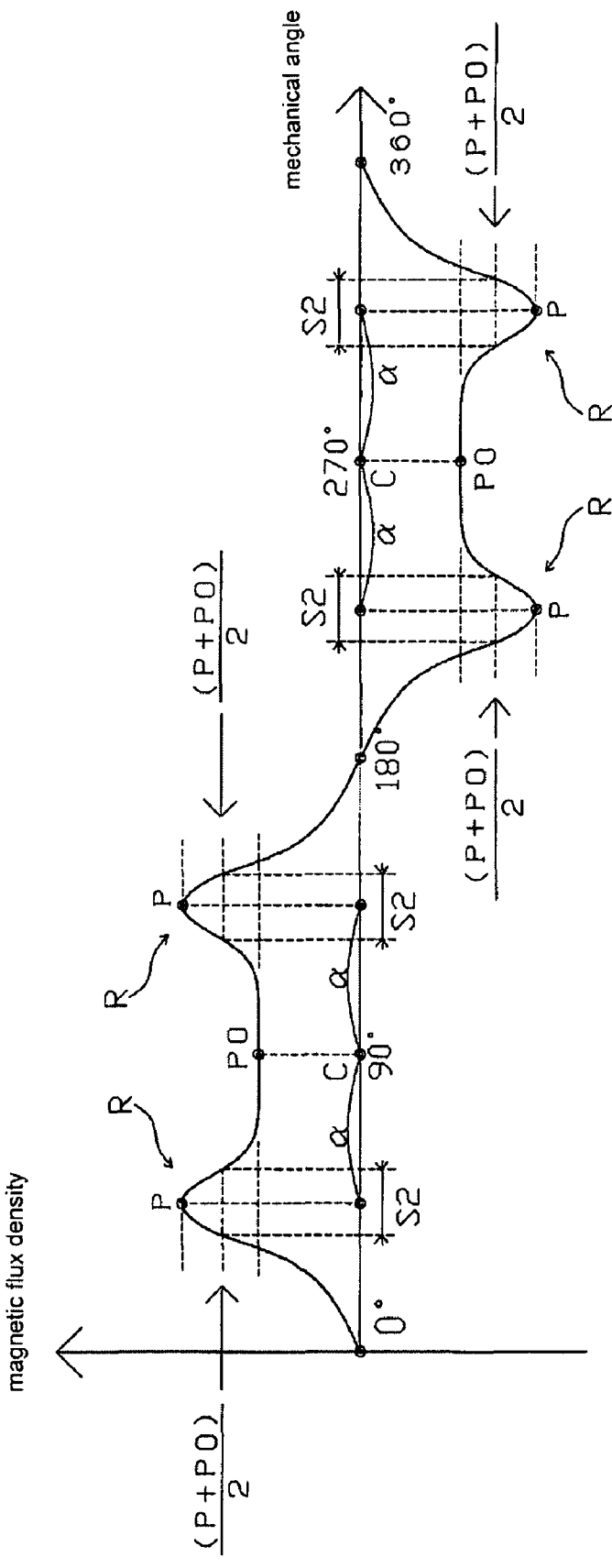
FIG. 3 serves to describe the characteristics of the magnetization waveform of the permanent magnet in the compact motor of the present invention.

The characteristics of the magnetization waveform of the permanent magnet 13 used in this experimental example are described by way of FIG. 3. In FIG. 3, the horizontal axis indicates the angle on the internal face of the magnet (mechanical angle) and the vertical axis indicates the magnetic flux density at the surface of the permanent magnet.

The magnetization waveform was measured by bringing a Hall element into contact at the approximate center in the axial direction of the circumferential interior of the permanent magnet 13 and rotating the yoke 12, on the inner circumference of which the permanent magnet 13 was affixed, in the circumferential direction.

As shown in FIG. 3, in this experimental example, the permanent magnet 13 was bipolar-magnetized and had regions at which the magnetic flux density was at a maximum value P at a predetermined angle $\alpha$ (°) from the center C of the magnetic poles on the two sides thereof. Note that the expression, center C of the magnetic pole, refers to midway between the two boundaries between the north pole and the south pole and, as shown in FIG. 3, the center C of the north pole, which occupies the range from 0° to 180°, is at 90°, while the center C of the south pole, which occupies the range from 180° to 360°, is at 270°.

In this experimental example, the output torque and the cogging torque were measured and compared for 11 compact motors, which were constructed using 11 types of permanent magnets in which the maximum value P in the magnetization waveforms shown in FIG. 3 were at differing positions (which is to say, different angles $\alpha$), as well as a compact motor constructed using a permanent magnet with the magnetization waveform shown in FIG. 2(a).

Figure 4:
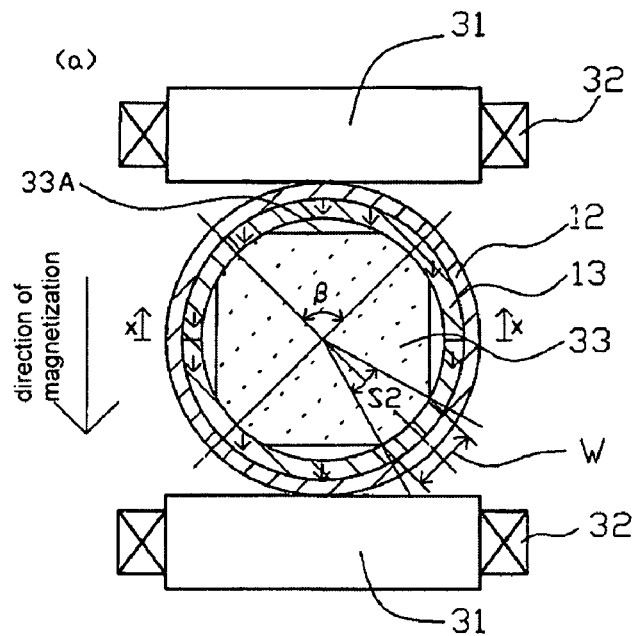
FIG. 4 shows: (a) a device for magnetizing the permanent magnet used in the experimental examples of the present invention; (b) a sectional view of this magnetizing device according to the line x-x; and (c) a perspective view of the core.
Figure 4:
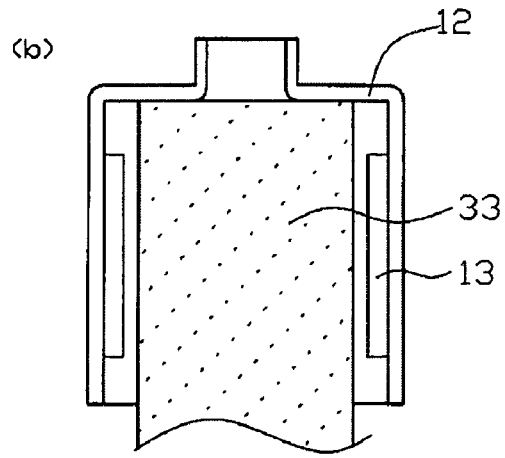
Figure 4:
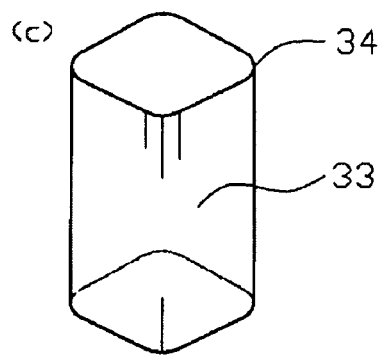

Specifically, the 11 types of permanent magnets 13 used in this experimental example were magnetized using a device of the sort shown in FIG. 4. In FIG. 4, reference numerals 31 indicate magnetizing yokes, on each of which a magnetizing coil is wound. A core 33 is interposed within a cylinder of magnetic material. This cylinder of magnetic material, which is to serve as the permanent magnet 13, and has not yet been magnetized, is disposed at the inner circumferential face of a yoke 12, which is positioned between a pair of the magnetizing yokes 31. In this sate, magnetization is performed by applying DC pulse voltage to the magnetizing coils 32.

The core 33 is a solid, substantially rectangular prism having a substantially rectangular cross-section, the four corners 34 of which are rounded, and are disposed so as to contact the inner circumferential face of the unmagnetized cylinder of magnetic material, which is to serve as the permanent magnet 13, with a contact width W at each of the corners. One side 33A of this core 33 is disposed so as to be substantially orthogonal to a parallel magnetic field that is applied from the exterior of the yoke 12.

In this experimental example, the contact width W of the core 33 as shown in FIG. 4 was kept constant at 1.25 mm, while the opening angle β for the side of the rectangular core 33 that is orthogonal to the yoke-external parallel magnetic field was varied in 11 steps, ranging from 65° to 115°. In other words, magnetization was performed using 11 types of cores 33 having rectangular cross-sections with differing opening angles β. The angle α in the magnetization waveform shown in FIG. 3 corresponds to approximately ½ of the opening angle β.

Note that the permanent magnet with the magnetization waveform of FIG. 2(a) was magnetized under exactly the same conditions as used for the 11 types of permanent magnet mentioned above, other than the fact that a solid cylindrical core was used for magnetization.

Figure 5:
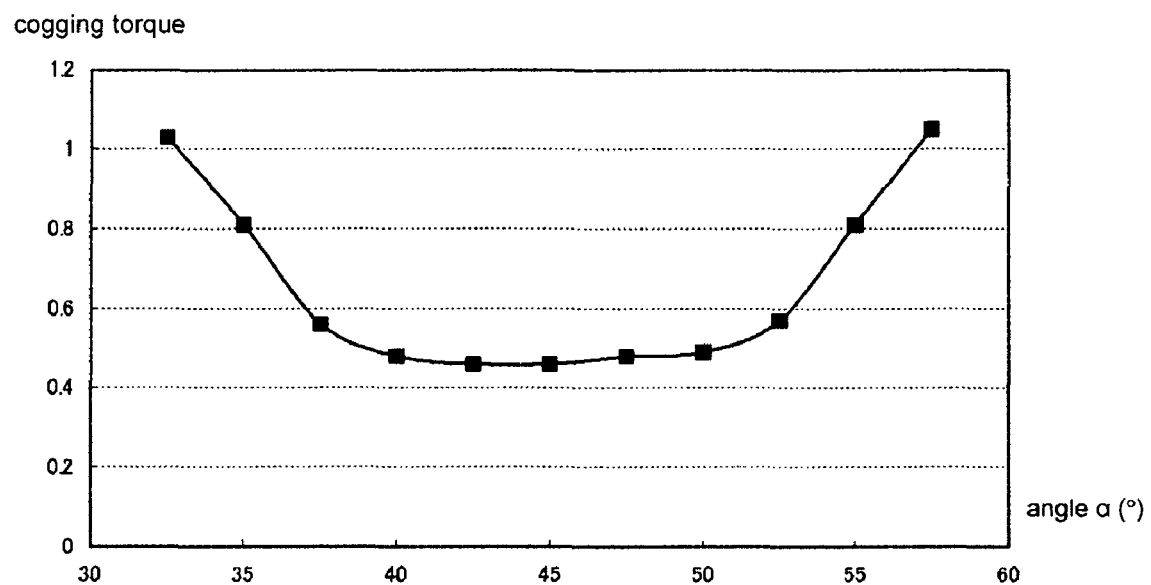
FIG. 5 is a graph showing the cogging torque results for Experimental Example 1.

Table 1 and FIG. 5 show the results for this experimental example.

In Table 1, P/P0 represents the ratio between the maximum magnetic flux density value P in the magnetization waveform shown in FIG. 3, and the magnetic flux density P0 at the center C of the magnetic pole. Furthermore, the cogging torque and output torque are relative values, where the cogging torque and output torque of the compact motor using the permanent magnet with the magnetization waveform shown in FIG. 2(a) are both 1.

In FIG. 5, the horizontal axis indicates the aforementioned angle α and the vertical axis indicates the relative value for cogging torque. Note that the average value for all of the peak values (P1 to P6) as shown in FIG. 2(b) is used for the cogging torque.

TABLE 1

| | Angle α | P/P0 | Cogging Torque | Output Torque |
|---|---|---|---|---|
| Experimental Example 1-1 | 32.5 | 1.81 | 1.03 | 0.99 |
| Experimental Example 1-2 | 35 | 1.81 | 0.81 | 0.99 |
| Experimental Example 1-3 | 37.5 | 1.8 | 0.56 | 0.99 |
| Experimental Example 1-4 | 40 | 1.8 | 0.48 | 0.99 |
| Experimental Example 1-5 | 42.5 | 1.78 | 0.46 | 0.99 |
| Experimental Example 1-6 | 45 | 1.77 | 0.46 | 1.00 |
| Experimental Example 1-7 | 47.5 | 1.77 | 0.48 | 0.99 |
| Experimental Example 1-8 | 50 | 1.75 | 0.49 | 1.00 |
| Experimental Example 1-9 | 52.5 | 1.75 | 0.57 | 1.00 |
| Experimental Example 1-10 | 55 | 1.75 | 0.81 | 1.00 |
| Experimental Example 1-11 | 57.5 | 1.75 | 1.05 | 1.00 |

As is clear from Table 1, the output torque is substantially the same in all cases. Meanwhile, as is clear from Table 1 and FIG. 5, when the angle α is in the range of 40° to 50°, which is to say, when the maximum magnetic flux density value P is in the range of 40° to 50° from the center on the two sides of the magnetic pole, cogging torque can be effectively reduced.

Note that, when the angle α is in the range of 40° to 50°, this corresponds to the opening angle β for one side of the rectangular core being within the range of 80° to 100°.

Furthermore, it was understood that, even when the contact width W of the core shown in FIG. 4 was made twice that mentioned above (2.5 mm), an effect similar to that described above was achieved, and when the maximum magnetic flux density value P was present in the range of 40° to 50° from the center on the two sides of the magnetic pole, the cogging torque could be effectively reduced.

Experimental Example 2

In this experimental example, maximum magnetic flux density values P were located at approximately 42.5° from the center on the two sides of the magnetic pole in each of the magnetic poles of the bipolar-magnetized permanent magnet 13 and, other than changing the shape (width and height) of the region in which this maximum value P was present, a total of 18 compact motors were constructed in the same manner as in Experimental Example 1. The cogging torque and output torque were then measured.

Specifically, using the device shown in FIG. 4, the opening angle β for the side of the rectangular core 33 that is orthogonal to the yoke-external parallel magnetic field was kept constant at 85°, while the contact width W of the core 33 was varied in a range of 1.25 mm to 6.5 mm, for the permanent magnets 13 that were used in this experimental example. In other words, magnetization was performed using 18 types of cores 33, wherein the corners 34 had different radii of curvature.

Figure 6:
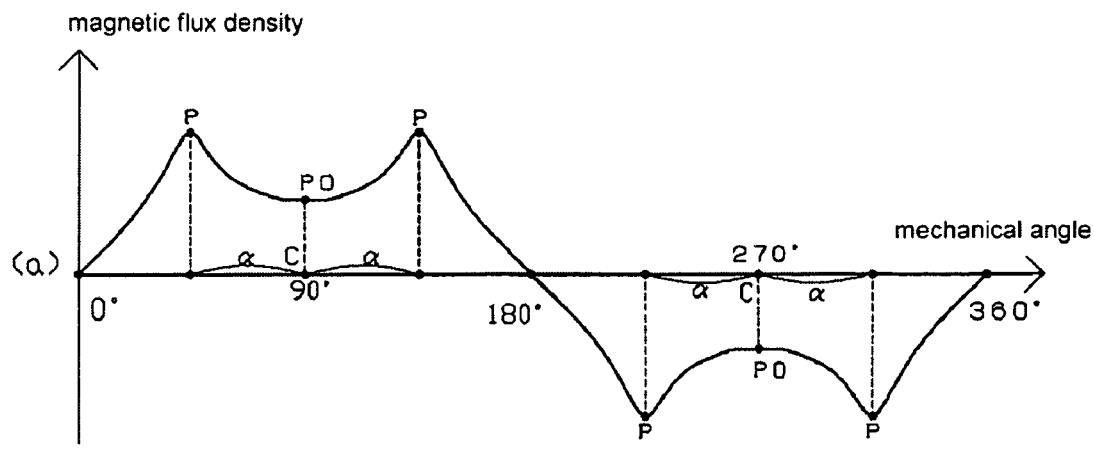
FIG. 6 serves to describe the changes in the magnetization waveform of the permanent magnet when the contact width W of the core is varied in Experimental Example 2.
Figure 6:
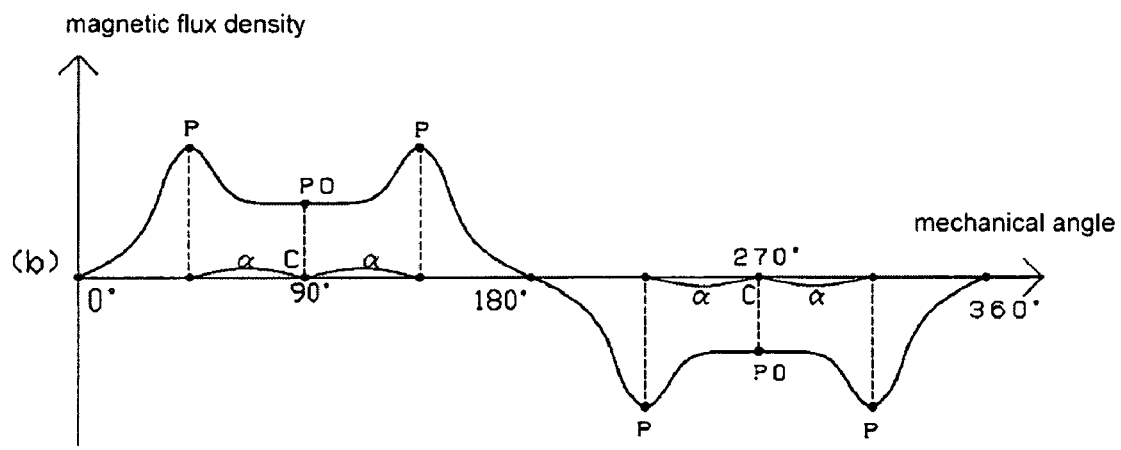
Figure 6:
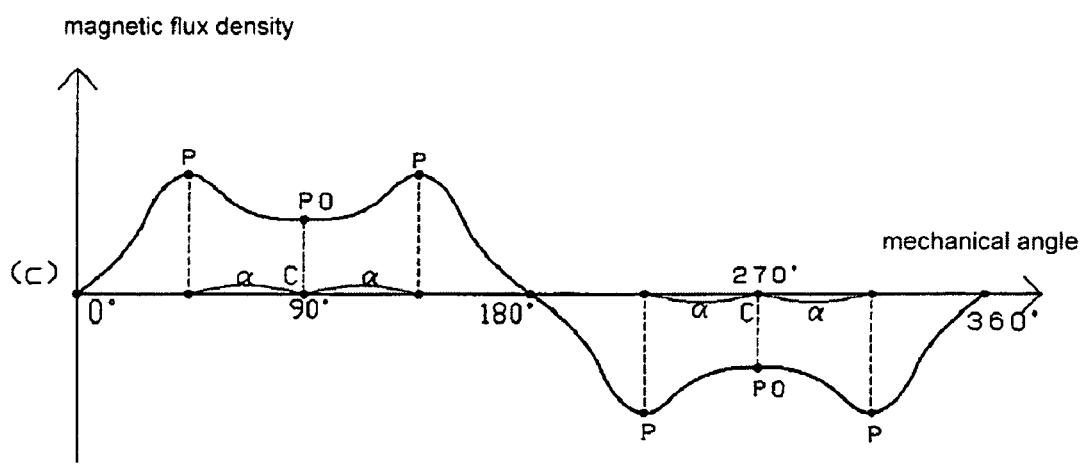

When magnetization is performed with the contact width W of the core 33 varied in this manner, the shape (width and height) of the region in which the maximum value P is present changes, as indicated by some of the magnetization waveforms, which are shown in FIG. 6. FIG. 6(a) is the magnetization waveform for the case where the contact width W was 1.25 mm, FIG. 6(b) is the magnetization waveform for the case where the contact width W was 4.25 mm, and FIG. 6(c) is the magnetization waveform for the case where the contact width W was 6.5 mm.

Table 2 shows the results of measurements in this experimental example. Note that, P/P0 represents the ratio between the maximum magnetic flux density value P in the magnetization waveform and the magnetic flux density P0 in the center C of the magnetic pole. Furthermore, as in Experimental Example 1, cogging torque and output torque are relative values, where the cogging torque and output torque of the compact motor using the permanent magnet with the magnetization waveform shown in FIG. 2(a) are both 1.

TABLE 2

| | Contact Width W | P/P0 | Cogging Torque | Output Torque |
|---|---|---|---|---|
| Experimental Example 2-1 | 1.25 | 1.8 | 0.46 | 0.99 |
| Experimental Example 2-2 | 1.5 | 1.7 | 0.41 | 0.99 |
| Experimental Example 2-3 | 1.75 | 1.67 | 0.37 | 0.99 |

TABLE 2-continued

| | Contact Width W | P/P0 | Cogging Torque | Output Torque |
|---|---|---|---|---|
| Experimental Example 2-4 | 2 | 1.63 | 0.35 | 0.99 |
| Experimental Example 2-5 | 2.25 | 1.62 | 0.33 | 0.99 |
| Experimental Example 2-6 | 2.5 | 1.6 | 0.31 | 1.00 |
| Experimental Example 2-7 | 2.75 | 1.6 | 0.29 | 1.00 |
| Experimental Example 2-8 | 3 | 1.58 | 0.29 | 1.00 |
| Experimental Example 2-9 | 3.25 | 1.57 | 0.23 | 1.00 |
| Experimental Example 2-10 | 3.5 | 1.55 | 0.18 | 1.00 |
| Experimental Example 2-11 | 3.75 | 1.55 | 0.15 | 1.00 |
| Experimental Example 2-12 | 4 | 1.52 | 0.15 | 1.00 |
| Experimental Example 2-13 | 4.25 | 1.48 | 0.14 | 1.00 |
| Experimental Example 2-14 | 4.5 | 1.47 | 0.21 | 1.00 |
| Experimental Example 2-15 | 5 | 1.45 | 0.24 | 1.00 |
| Experimental Example 2-16 | 5.5 | 1.42 | 0.24 | 1.00 |
| Experimental Example 2-17 | 6 | 1.4 | 0.25 | 1.00 |
| Experimental Example 2-18 | 6.5 | 1.38 | 0.31 | 1.00 |

As shown in Table 2, when the maximum magnetic flux density value P is positioned at approximately 42.5° from the center on the two sides of the magnetic pole, for each of the magnetic poles of the bipolar-magnetized permanent magnet 13, even if the contact width W is changed over a wide range, the cogging torque is reduced without lowering the output torque. Here, the maximum magnetic flux density value P is in the range of 1.3 to 1.8 times the magnetic flux density P0 at the center C of the magnetic pole. Furthermore, in particular when the maximum magnetic flux density value P is approximately 1.5 times the magnetic flux density P0 at the center of the magnetic pole, the cogging torque is reduced to approximately ⅕ that with the conventional sinusoidal wave magnetization, which is a remarkable result.

Furthermore, it was understood that, in cases where the maximum magnetic flux density value P is positioned at approximately 40° from the center on the two sides of the magnetic pole, and in cases where the maximum flux density value P is positioned at approximately 50° from the center on the two sides of the magnetic pole, a trend similar to that described above is produced, and when the maximum magnetic flux density value P is in the range of 1.3 to 1.8 times the magnetic flux density P0 at the center C of the magnetic pole, the cogging torque can be effectively reduced.

Furthermore, in cases where the maximum magnetic flux density value P in the magnetization waveform of the permanent magnet 13 is less than 1.3 times the magnetic flux density P0 at the center C of the magnetic pole, the effect of reducing the cogging torque by providing the maxima R shown in FIG. 3 is decreased, while if the maximum magnetic flux density value P in the magnetization waveform exceeds 1.8 times the magnetic flux density P0 at the center C of the magnetic pole, the maxima R become sharp, and there is conversely a tendency towards increased cogging.

According to Experimental Example 1 and Experimental Example 2, which have been described above, by forming a region in which the maximum magnetic flux density value P is present within the range of 40° to 50° from the center on the two sides of the magnetic pole, and by causing this maximum value P to be within a range of 1.3 times to 1.8 times the magnetic flux density P0 at the center C of the magnetic pole, it is possible to effectively reduce the cogging torque without lowering the output torque.

Furthermore, when the motor is manufactured using a bipolar permanent magnet and a three-pole armature core, an unmagnetized cylinder of magnetic material is affixed to the inner surface of the yoke 12 and a core 33, having a substantially rectangular cross-section, is disposed so as to contact the interior of the cylinder of magnetic material. When the cylinder of magnetic material is provided with a bipolar magnetization by way of a yoke-external parallel magnetic field that is substantially orthogonal to one side 33A of this rectangle, by using as the core 33 a core wherein this one side 33A of the rectangle has an opening angle β in the range of 80° to 100°, an area is formed wherein the maximum magnetic flux density value P is present in the range of 40° to 50° from the center on the two sides of the magnetic pole. The maximum value P can be caused to be within a range of 1.3 times to 1.8 times the magnetic flux density P0 at the center C of the magnetic pole. It is thus possible to easily realize a high-quality compact motor with which cogging torque can be reduced without lowering output torque, using an extremely simple magnetization device.

Experimental Example 3

Furthermore, the present inventors conducted experiments using a plurality of armature cores 22 having different opening angles for the slots S1, which are shown in FIG. 1. As a result, it was discovered that, if the permanent magnet 13 has a magnetization waveform such as shown in FIG. 3, in the areas of the maxima R that include the maximum values P, if there is a certain constant relationship between the opening angle S2 of the region having a magnetic flux density equal to or greater than the average of the maximum value P and the magnetic flux density P0 at the center C of the magnetic pole ((P+P0)/2), and the opening angle S1 for the slots, it is possible to further reduce the cogging torque without lowering the output torque. Hereafter, this experimental example is described in specific terms.

In this experimental example, 3 types of armature cores were used, having slot widths SH of 1.11 mm, 2.11 mm and 3.11 mm.

Magnetization of the permanent magnets 13 was performed with the device shown in FIG. 4, with the opening angle β of the side of the rectangular core 33 that is orthogonal to the yoke-external parallel magnetic field kept constant at 85°, while the contact width W of the core 33 was varied to 1.25 mm, 2.25 mm, 4.25 mm and 6.5 mm, which is to say that 4 types of cores were used wherein the corners 34 had different radii of curvature. The permanent magnets 13 that were magnetized in this manner were all such that, in each of the magnetic poles of the bipolar-magnetized permanent magnet 13, a maximum magnetic flux density value P was present at a position of approximately 42.5° from the center on the two sides of the magnetic pole.

Here, calculation of the opening angle for the slots S1 from the slot width SH is as follows.

If the slot width is 1.11 mm, then because the external diameter of the armature core is ϕ 15 mm, $$\text{opening angle for the slots } S1 = 1.11/(\pi \times 15) \times 360° \approx 8.5°$$

Likewise, if the slot width SH is 2.11 mm or 3.11 mm, the opening angle for the slots S1 will be 16.1° or 23.8°, respectively.

Figure 7:
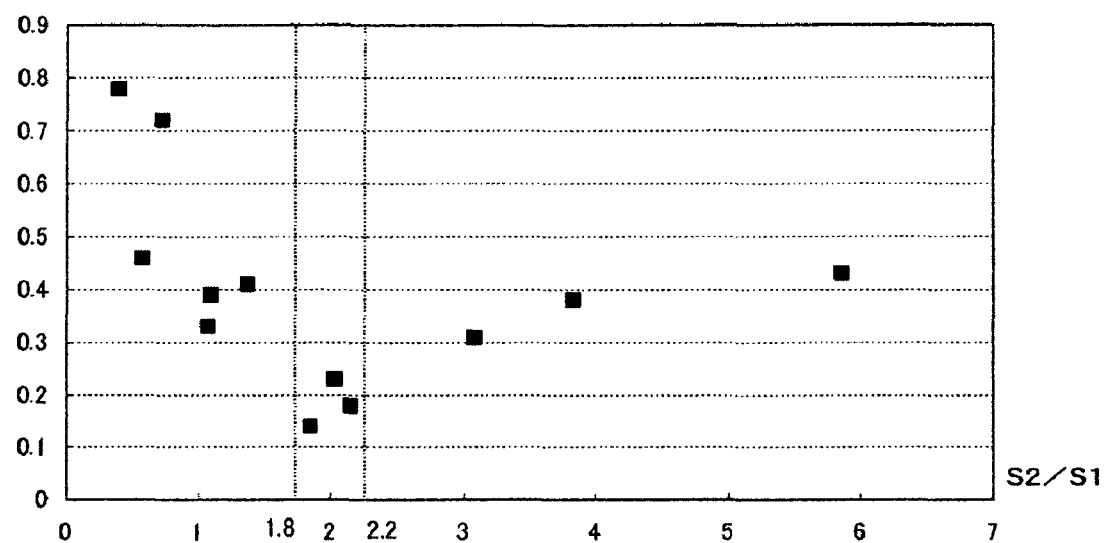
FIG. 7 is a graph showing the cogging torque results for Experimental Example 3.
Figure 8:
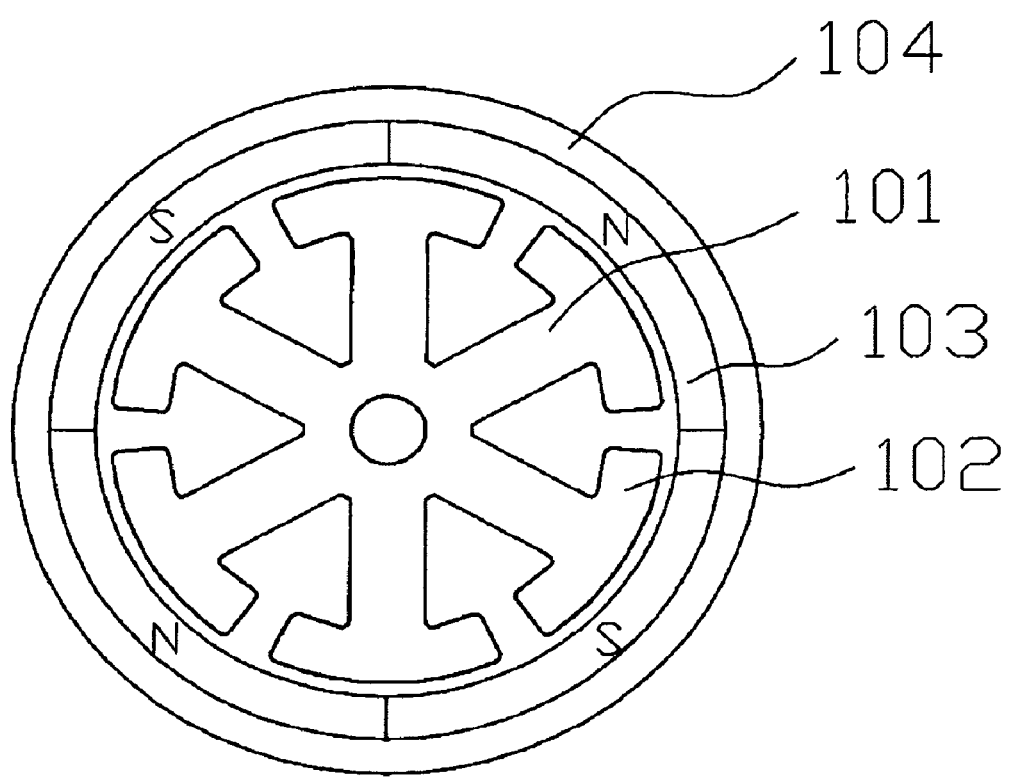
FIG. 8 is a sectional view of a conventional compact motor.

Table 3 and FIG. 7 show the results of measurements in this experimental example. Note that, as in Experimental Example 1, cogging torque and output torque are relative values, where the cogging torque and output torque of the compact motor using the permanent magnet with the magnetization waveform shown in FIG. 2(a) are both 1.

In Table 3, the opening angle S2 is the opening angle of the region (hatched area) having a magnetic flux density that is greater than or equal to the average of the maximum value P and the magnetic flux density P0 at the center C of the magnetic pole ((P+P0)/2) in the area of the maxima R including the maximum value P with a magnetization waveform such as shown in FIG. 3. Furthermore, P/P0 represents the ratio between the maximum magnetic flux density value P in the magnetization waveform and the magnetic flux density P0 at the center C of the magnetic pole.

In FIG. 7, the horizontal axis indicates the ratio between the aforementioned opening angle S2 and the aforementioned opening angle S1 (S2/S1) and the vertical axis indicates the relative value for cogging torque.

TABLE 3

|  | W (mm) | S1 (Degrees) | S2 (Degrees) | S2/S1 | P/P0 | Cogging Torque | Output Torque |
|---|---|---|---|---|---|---|---|
| Experimental Example 3-1 | 1.25 | 8.5 | 9.24 | 1.09 | 1.8 | 0.39 | 0.99 |
| Experimental Example 3-2 | 2.25 | 8.5 | 16.6 | 2.03 | 1.62 | 0.23 | 0.99 |
| Experimental Example 3-3 | 4.25 | 8.5 | 31.4 | 3.83 | 1.48 | 0.38 | 1.00 |
| Experimental Example 3-4 | 6.5 | 8.5 | 48.1 | 5.86 | 1.38 | 0.43 | 1.00 |
| Experimental Example 3-5 | 1.25 | 16.1 | 9.24 | 0.57 | 1.8 | 0.46 | 0.99 |
| Experimental Example 3-6 | 2.25 | 16.1 | 16.6 | 1.07 | 1.62 | 0.33 | 0.99 |
| Experimental Example 3-7 | 4.25 | 16.1 | 31.4 | 1.85 | 1.48 | 0.14 | 1.00 |
| Experimental Example 3-8 | 6.5 | 16.1 | 48.1 | 3.08 | 1.38 | 0.31 | 1.00 |
| Experimental Example 3-9 | 1.25 | 23.8 | 9.24 | 0.39 | 1.8 | 0.78 | 0.98 |
| Experimental Example 3-10 | 2.25 | 23.8 | 16.6 | 0.72 | 1.62 | 0.72 | 0.98 |
| Experimental Example 3-11 | 4.25 | 23.8 | 31.4 | 1.37 | 1.48 | 0.41 | 0.98 |
| Experimental Example 3-12 | 6.5 | 23.8 | 48.1 | 2.15 | 1.38 | 0.18 | 0.99 |

As shown in Table 3, when the maximum magnetic flux density value is positioned at approximately 42.5° from the center on the two sides of the magnetic pole, for each of the magnetic poles of the bipolar-magnetized permanent magnet, even if the slot width SH of the armature core 22 is changed to a certain extent, the cogging torque is reduced without lowering the output torque.

Furthermore, as will be understood from FIG. 7, the cogging torque is notably at a minimum when the S2/S1 value is in the range of 1.8 to 2.2, the cogging torque being reduced to less than one quarter of that with the conventional sinusoidal magnetization, which is a remarkable result.

Furthermore, in cases where the maximum magnetic flux density value P is positioned at approximately 40° from the center on the two sides of the magnetic pole, and in cases where the maximum flux density value P is positioned at approximately 50° from the center on the two sides of the magnetic pole, a trend similar to that described above is produced, and it was understood that when the S2/S1 value is in the range of 1.8 to 2.2, the cogging torque can be extremely effectively reduced.

From the above, it is understood that, by forming an area in which the maximum magnetic flux density value P is present in the range of 40° to 50° from the center of the magnetic pole on the two sides, in each of the magnetic poles for the bipolar-magnetized permanent magnet, and causing this maximum value P to be within the range of 1.3 times to 1.8 times the magnetic flux density P0 at the center of the magnetic pole, while the opening angle S2 of a region having a magnetic flux density that is greater than or equal to the average of the maximum value P and the magnetic flux density P0 at the center of the magnetic pole ((P+P0)/2) in the region that includes the maximum value P is in the range of 1.8 times to 2.2 times the opening angle for the slots S1, it is possible to extremely effectively reduce the cogging torque without lowering the output torque.

Note that, in this experimental example, cases were shown in which the opening angles S1 for the slots were 8.5°, 16.1° and 23.8°. Note that, if the opening angle S1 for the slots is less than 8°, there is a problem in that the pole winding work becomes difficult and the labor effectiveness is greatly reduced, while if the opening angle S1 for the slots exceeds 25°, there is a problem in that the facing surface area of the salient pole 28 that faces the permanent magnet 13 is reduced, so that the output torque itself is lowered. For these reasons, the opening angle S1 for the slots of the armature core 22 is preferably within the range of 8° to 25°.

What is claimed is:
1. A compact motor comprising:
a hollow cylindrical yoke;
a cylindrical permanent magnet affixed to an inner surface of the hollow cylindrical yoke;
an armature core disposed at the interior of the permanent magnet; and
three slots disposed at a uniform pitch in the armature core, the cylindrical permanent magnet being bipolar-magnetized and having two permanent magnet poles with each permanent magnet pole having a maximum magnetic flux density value located at a position in a range of 40° to 50° from a center on two respective sides of the permanent magnet pole, the maximum magnetic flux density value being within a range of 1.3 times to 1.8 times the magnetic flux density at the center of the magnetic pole.

2. The compact motor according to claim 1, wherein, within a region that includes the maximum magnetic flux density value, an opening angle of a region having a magnetic flux density that is greater than or equal to an average of the maximum magnetic flux density value and the magnetic flux density at the center of the permanent magnet pole is within a range of 1.8 times to 2.2 times the opening angle for the slots.

3. The compact motor according to claim 2, wherein the opening angle for the slots is within the range of 8° to 25°.

4. The compact motor according to claim 1, wherein the cylindrical permanent magnet has a circular outer surface having a first diameter and a circular inner surface having a second diameter less than the first diameter.

* * * * *